United States Patent
Heller

(10) Patent No.: US 8,679,688 B2
(45) Date of Patent: *Mar. 25, 2014

(54) BIOLOGICAL FUEL CELL AND METHODS

(71) Applicant: Abbott Diabetes Care Inc., Alameda, CA (US)

(72) Inventor: Adam Heller, Austin, TX (US)

(73) Assignee: Abbott Diabetes Care In., Alameda, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/862,153

(22) Filed: Apr. 12, 2013

(65) Prior Publication Data
US 2013/0288140 A1   Oct. 31, 2013

Related U.S. Application Data

(60) Continuation of application No. 13/567,903, filed on Aug. 6, 2012, now Pat. No. 8,435,682, which is a continuation of application No. 12/944,551, filed on Nov. 11, 2010, now Pat. No. 8,241,797, which is a continuation of application No. 12/876,816, filed on Sep. 7, 2010, now Pat. No. 7,998,624, which is a continuation of application No. 11/768,560, filed on Jun. 26, 2007, now Pat. No. 7,811,689, which is a continuation of application No. 11/277,696, filed on Mar. 28, 2006, now Pat. No. 7,238,442, which is a division of application No. 10/385,069, filed on Mar. 10, 2003, now Pat. No. 7,018,735, which is a continuation of application No. 09/961,621, filed on Sep. 24, 2001, now Pat. No. 6,531,239, which is a continuation of application No. 09/203,227, filed on Nov. 30, 1998, now Pat. No. 6,294,281.

(60) Provisional application No. 60/089,900, filed on Jun. 17, 1998.

(51) Int. Cl.
*H01M 8/16* (2006.01)
*G06T 7/00* (2006.01)

(52) U.S. Cl.
USPC .............. 429/401; 429/531; 382/131

(58) Field of Classification Search
USPC .................... 382/131; 429/401, 531
See application file for complete search history.

(56) References Cited

U.S. PATENT DOCUMENTS 3,774,243 A   11/1973   Ng et al.
3,811,950 A   5/1974    Avampato et al.

(Continued)

FOREIGN PATENT DOCUMENTS

| DE | 301808  | 11/1917 |
|----|---------|---------|
| DE | 4126692 | 2/1993  |

(Continued)

OTHER PUBLICATIONS

Alkire et al., "Current Distribution in a Tubular Electrode under Laminar Flow: One Electrode Reaction," J. Electrochem. Soc.: Electrochemical Science and Technology. 1977, vol. 124, No. 7, pp. 1043-1049.

(Continued)

*Primary Examiner* — Mark F Huff
*Assistant Examiner* — Monique Wills
(74) *Attorney, Agent, or Firm* — Edward J. Baba; Bozicevic, Field & Francis LLP

(57) ABSTRACT

A fuel cell has an anode and a cathode with anode enzyme disposed on the anode and cathode enzyme is disposed on the cathode. The anode is configured and arranged to electrooxidize an anode reductant in the presence of the anode enzyme. Likewise, the cathode is configured and arranged to electroreduce a cathode oxidant in the presence of the cathode enzyme. In addition, anode redox hydrogel may be disposed on the anode to transduce a current between the anode and the anode enzyme and cathode redox hydrogel may be disposed on the cathode to transduce a current between the cathode and the cathode enzyme.

21 Claims, 1 Drawing Sheet

(56) References Cited

U.S. PATENT DOCUMENTS

| | | | |
|---|---|---|---|
| 3,861,397 | A | 1/1975 | Rao et al. |
| 4,117,202 | A | 9/1978 | Beck |
| 4,224,125 | A | 9/1980 | Nakamura et al. |
| 4,431,004 | A | 2/1984 | Bessman et al. |
| 4,490,464 | A | 12/1984 | Gorton et al. |
| 4,581,336 | A | 4/1986 | Malloy et al. |
| 4,806,468 | A | 2/1989 | Wagner et al. |
| 4,820,399 | A | 4/1989 | Senda et al. |
| 4,820,636 | A | 4/1989 | Hill et al. |
| 5,126,247 | A | 6/1992 | Palmer et al. |
| 5,262,035 | A | 11/1993 | Gregg et al. |
| 5,262,305 | A | 11/1993 | Heller et al. |
| 5,264,104 | A | 11/1993 | Gregg et al. |
| 5,320,725 | A | 6/1994 | Gregg et al. |
| 5,356,786 | A | 10/1994 | Heller et al. |
| 5,478,754 | A | 12/1995 | Brandt et al. |
| 5,506,144 | A | 4/1996 | Sundrehagen |
| 5,593,852 | A | 1/1997 | Heller et al. |
| 5,609,749 | A | 3/1997 | Yamauchi et al. |
| 5,639,672 | A | 6/1997 | Burd et al. |
| 5,651,869 | A | 7/1997 | Yoshioka et al. |
| 5,665,222 | A | 9/1997 | Heller et al. |
| 5,804,401 | A | 9/1998 | Gardiol et al. |
| 5,807,747 | A | 9/1998 | Wallworth et al. |
| 5,837,546 | A | 11/1998 | Allen et al. |
| 5,888,787 | A | 3/1999 | Chen et al. |
| 5,906,921 | A | 5/1999 | Ikeda et al. |
| 5,972,199 | A | 10/1999 | Heller et al. |
| 6,054,039 | A | 4/2000 | Shieh |
| 6,103,033 | A | 8/2000 | Say et al. |
| 6,120,676 | A | 9/2000 | Heller et al. |
| 6,134,461 | A | 10/2000 | Say et al. |
| 6,143,164 | A | 11/2000 | Heller et al. |
| 6,174,734 | B1 | 1/2001 | Ito et al. |
| 6,175,752 | B1 | 1/2001 | Say et al. |
| 6,262,264 | B1 | 7/2001 | Buck, Jr. et al. |
| 6,294,062 | B1 | 9/2001 | Buck, Jr. et al. |
| 6,294,281 | B1 | 9/2001 | Heller |
| 6,338,790 | B1 | 1/2002 | Feldman et al. |
| 6,352,824 | B1 | 3/2002 | Buck, Jr. et al. |
| 6,399,293 | B1 | 6/2002 | Pachl et al. |
| 6,436,255 | B2 | 8/2002 | Yamamoto et al. |
| 6,500,571 | B2 | 12/2002 | Liberatore et al. |
| 6,531,239 | B2 | 3/2003 | Heller |
| 6,599,407 | B2 | 7/2003 | Taniike et al. |
| 6,740,215 | B1 | 5/2004 | Nakaminami et al. |
| 6,746,582 | B2 | 6/2004 | Heller et al. |
| 6,766,817 | B2 | 7/2004 | da Silva |
| 6,885,196 | B2 | 4/2005 | Taniike |
| 6,918,404 | B2 | 7/2005 | da Silva |
| 7,018,735 | B2 | 3/2006 | Heller |
| 7,066,586 | B2 | 6/2006 | da Silva |
| 7,238,442 | B2 | 7/2007 | Heller |
| 7,998,625 | B2 * | 8/2011 | Heller ............................ 429/401 |
| 8,241,797 | B2 | 8/2012 | Heller |
| 2002/0172992 | A1 | 11/2002 | Heller |
| 2003/0152823 | A1 | 8/2003 | Heller |
| 2004/0101741 | A1 | 5/2004 | Minteer et al. |
| 2008/0044721 | A1 | 2/2008 | Heller et al. |

FOREIGN PATENT DOCUMENTS

| | | |
|---|---|---|
| DE | 4314417 | 11/1994 |
| DE | 4344646 | 6/1995 |
| EP | 0745843 | 12/1996 |
| JP | 55078242 | 6/1980 |
| JP | 57012359 | 1/1982 |
| WO | WO 8906802 | 7/1989 |
| WO | WO 0206828 | 1/2002 |

OTHER PUBLICATIONS

Aoki et al., "Effect of Quaternization on Electron Diffusion Coefficients for Redox Hydrogels Based on Poly(4-vinylpyridine)," The Journal of Physical Chemistry. 1995, vol. 99, No. 14, pp. 5012-5110.
Aoki et al., "Electron Diffusion Coefficients in Hydrogels Formed of Cross-Linked Redox Polymers," The Journal of Physical Chemistry. 1993, vol. 97, pp. 11014-11019.
Barton et al., "Electroreduction of O2 to Water on the 'Wired' Laccase Cathode," J. Phys. Chem. B. 2001, vol. 105, pp. 11917-11921.
Barton et al., "Electroreduction of 02 to Water at 0.6 V (SHE) at pH 7 on the 'Wired' *Pleurotus ostreatus* Laccase Cathode," Biosensors and Bioelectronics. 2002, vol. 17, pp. 1071-1074.
Barton et al., "The 'Wired' Laccase Cathode: High Current Density Electroreduction of O2 to Water at +0.7 V (NHE) at pH 5," J. Am. Chem. Soc. 2001, vol. 123, pp. 5802-5803.
Binyamin et al., "Mechanical and Electrochemical Characteristics of Composites of Wired Glucose Oxidase and Hydrophilic Graphite," Journal of the Electrochemical Society. 2000, vol. 147, No. 7, pp. 2780-2783.
Binyamin et al., "Stabilization of Wired Glucose Oxidase Anodes Rotating at 1000 rpm at 37° C.," Journal of the Electrochemical Society. 1999, vol. 146, No. 8, pp. 2965-2967.
Blauch et al., "Effects of Long-Range Electron Transfer on Charge Transport in Static Assemblies of Redox Centers," The Journal of Physical Chemistry. 1993, vol. 97, No. 24, pp. 6444-6448.
Chen et al., "A Miniature Biofuel Cell," Journal of the American Chemical Society. 2001, vol. 123, No. 35, pp. 8630-8631.
Chen et al., "In Situ Assembled Mass-Transport Controlling Micromembranes and Their Application in Implanted Amperometric Glucose Sensors," Analytical Chemistry. Aug. 15, 2000, vol. 72, No. 16, pp. 3757-3763.
Colon et al., "Cobalt Polypyridyl Complexes as Redox Mediators for Lipoamide Dehydrogenase," Electroanalysis, 1998, vol. 10, No. 9, pp. 621-627.
De Lumley-Woodyear et al., "Polyacrylamide-Based Redox Polymer for Connecting Redox Centers of Enzymes to Electrodes," Analytical Chemistry. 1995, vol. 67, No. 8, pp. 1332-1338.
Greenfield et al., "Inactivation of Immobilized Glucose Oxidase by Hydrogen Peroxide," Analytical Biochemistry. 1975, vol. 65, pp. 109-124.
Heller, "Electrical Connection of Enzyme Redox Centers to Electrodes," The Journal of Physical Chemistry. 1992, vol. 96, No. 9, pp. 3579-3587.
Jaremko et al., "Advances Toward the Implantable Artificial Pancreas for treatment of Diabetes," Diabetes Care. Mar. 1998, vol. 21, No. 3, pp. 444-450.
Jin et al., "Electron Transfer Between Cytochrome C and Copper Enzymes," Biochemistry and Bioenergetics. 1996, vol. 39, pp. 221-225.
Katakis et al., "Electrostatic Control of the Electron Transfer Enabling Binding of Recombinant Glucose Oxidase and Redox Polyelectrolytes," Journal of the American Chemical Society. 1994, vol. 116, No. 8, pp. 3617-3618.
Katz et al., "A Biofuel Cell Based on Two Immiscible Solvents and Glucose Oxidase and Microperoxidase-11 Monolayer-Functionalized Electrodes", New J. Chem., pp. 481-487 (1999).
Katz et al., "A Non-Compartmentalized Glucose .Vertline. O.sub.2 Biofuel Cell by Bioengineered Electrode Surfaces", Journal of Electroanalytical Chemistry, vol. 479, pp. 64-68 (1999).
Kenausis et al., "'Wiring' of Glucose Oxidase and Lactate Oxidase Within a Hydrogel Made with Poly(vinyl pyridine) Complexed with [Os(4,4'-dimethoxy-2,2'-bipyridine).sub.21].sup.+2/2+," The Journal of the Chemical Society, Faraday Transactions 1996, vol. 92. No. 20, pp. 4131-4136.
Koroljova-Skorobogat'Ko et al., "Purification and Characterization of the Constitutive Form of Laccase from the Basidiomycete Coriolus Hirsutus and Effect of Inducers on Laccase Synthesis," Biotechnol Appl Biochem. 1998, vol. 28, pp. 47-54.
Lee et al., "Catalysis of the Reduction of Dioxygen at Graphite Electrodes Coated with Fungal Laccase A," J. Electroanal. Chem. 1984, col. 172, pp. 289-300.
Mano et al., "A Miniature Biofuel Cell Operating at 0.78 V," Chem Commun. 2003, pp. 518-519.
Mano et al., "A Miniature Biofuel Cell Operating in a Physiological Buffer," J Am Chem Soc. 2002, vol. 124 pp. 12962-12963.
Mano et al., "An Oxygen Cathode Operating in a Physiological Solution," J. Am. Chem. Soc. 2002,124, 6480-6486.

(56) References Cited

OTHER PUBLICATIONS

Mano et al., "On the Relationship Between the Characteristics of Bilirubin Oxidases and O2 Cathodes Based on Their 'Wiring'," J Phys Chem B. 2002, vol. 106, pp. 8842-8848.

Ohara et al., "'Wired' Enzyme Electrodes for Amperometric Determination of Glucose or Lactate in the Presence of Interfering Substance," Analytical Chemistry. Aug. 1, 1994, vol. 66, No. 15, pp. 2451-2457.

Palmore et al., "A methanol / Dioxygen Biofuel cell that uses NAD.sup.+-dependent Dehydrogenases as Catalysts: Application of an Electro-Enzymatic Method to Regenerate Nicotinamide Adenine Dinucleotide at Low Overpotentials", Journal of Electroanalytical Chemistry, vol. 443, pp. 155-161 (Feb. 10, 1998).

Palmore et al., "Electro-Enzymatic Reduction of Dioxygen to Water in the Cathode Compartment of a Biofuel Cell", Journal of Electroanalytical Chemistry, vol. 464, pp. 110-117 (1999).

Palmore et al., "Microbial and Enzymatic Biofuel Cells", Enzymatic Conversion of Biomass for Fuels Production, Ch. 14, pp. 271-290 (1994).

Quinn et al., "Biocompatible, Glucose-Permeable Hydrogel for In Situ Coating of Implantable Biosensors," Biomaterials. 1997, vol. 18, No. 23, pp. 1665-1670.

Quinn et al., "Photo-Crosslinked Copolymers of 2-Hydroxyethyl Methacrylate, Poly(ethylene Glycol) Tetra-Acrylate and Ethylene Dimethacrylate for Improving Biocompatibility of Biosensors," Biomaterials. 1995. vol. 15. No. 5. pp. 389-396.

Rajagopalan et al., "Effect of Quaternization of the Glucose Oxidase 'Wiring' Redox Polymer on the Maximum Current Densities of Glucose Electrodes," The Journal of Physical Chemistry. 1996, vol. 100, No. 9, pp. 3719-3727.

Rajagopalan et al., "Electrical 'Wiring' of Glucose Oxidase in Electron Conducting Hydrogels," Molecular Electronics. 1997, Chapter 7, pp. 241-254.

Rao et al., "Metal-Oxygen and Glucose-Oxygen Cells for Implantable Devices," Biomedical Engineering. 1974, vol. 9, No. 3, pp. 98-102.

Santucci et al., "Unmediated Heterogeneous Electron Transfer Reaction of Ascorbate Oxidase and Laccase at a Gold Electrode," Biochem. J. 1990, vol. 332, pp. 611-615.

Sayka et al., "The Effect of Plasma Treatment on the Wettability of Substrate Materials," Solid State Technology. 1989, vol. 32, No. 5, pp. 69-70.

Service, "Can Chip Devices Keep Shrinking?" Science. Dec. 13, 1996, vol. 274, pp. 1834-1836.

Tarasevich et al., "Electrocatalysis of Cathodic Molecular Oxygen Reduction with Biopolymers-Enzymes and Their Models," J. Electroayal. Chem. 1986, vol. 206, pp. 217-227.

Tarasevich et al., "Electrocatalysis of a Cathodic Oxygen Reduction by Laccase," Bioelectrochemistry and Bioenergetics. 1979, vol. 6, pp. 393-403.

Taylor, "'Wiring' of Glucose Oxidase Within a Hydrogel Made with Polyvinyl Imidazole Complexed with [Os-4,4'-dimethoxy-2,2'-bipyridine )Cl].sup. +/2+," Journal of Electroanalytical Chemistry. 1995, vol. 396. pp. 511-515.

Thuesen et al., "Cyclic Voltammetry and Electrocatalysis of the Blue Copper Oxidase Polyporous Versicolor Laccase," Acta Chemica Scandinavica. 1998, vol. 52, pp. 555-562.

Trudeau et al., "Reagentless Mediated Laccase Electrode for the Detection of Enzyme Modulators", Anal. Chem., vol. 69, No. 5, pp. 882-886 (Mar. 1, 1997).

Tsujimura et al., "Bioelectrocatalytic Reduction of Dioxygen to Water at Neutral pH Using Bilirubin Oxidase as an Enzyme and 2,2'-Azinobis (3-ethylbenzothiazolin-6-sulfonate) as an Electron Transfer Mediator." Journal of Electroanalytical Chemistry. 2001, vol. 496, pp. 69-75.

Tsujimura et al., "Glucose/02 Biofuel Cell Operating at Physiological Conditions," Electrochemistry. 2002, vol. 70, No. 12, pp. 940-942.

Vreeke et al., "Hydrogen Peroxide and .beta.-Nicotinamide Adenine Dinucleotide Sensing Amperometric Electrodes Based on Electrical Connection of Horseradish Peroxidase Redox Centers to Electrodes Through a Three-Dimensional Electron Relaying Polymer Network," Analytical Chemistry. Dec. 15, 1992, vol. 64, No. 24, pp. 3084-3090.

Wagner et al., "Continuous Amperometric Monitoring of Glucose in a Brittle Diabetic Chimpanzee with a Miniature Subcutaneous Electrode," Proc. Natl. Acad. May 1998, vol. 95, pp. 6379-6382.

Willner et al., "A Biofuel Cell Based on Pyrroloquinoline Quinone and Microperoxidase-11 Monolayer-Functionalized Electrodes", Bioelectrochemistry and Bioenergetics, vol. 44, pp. 209-214 (Jan. 1998).

Willner et al., "Biofuel Cell Based on Glucose Oxidase and Microperoxidase-11 Monolayer-Functionalized Electrodes", Bioelectrochemistry and Bioenergetics, vol. 44, pp. 209-214 (Jan. 1998).

Willner et al., "Biofuel cell based on glucose oxidase and microperoxidase-11 monolayer-functionalized electrodes", J. Chem. Soc., Perkin Trans 2, vol. 8, pp. 1817-1822, (Aug. 1998).

Yahiro et al., "Bioelectrochemistry I. Enzyme Utilizing Bio-Fuel Cell Studies," Biochimica et Biophysica Acta. 1964, vol. 88, pp. 375-383.

Yaropolov et al., "Electrochemical properties of Some Copper-Containing Oxidases," Bioelectrochemistry and Bioenergetics. 1996, vol. 40, pp. 49-57.

Ye et al., "High Current Density 'Wired' Quinoprotein Glucose Dehydrogenase Electrode," Analytical Chemistry. Feb. 1, 1993, vol. 65, No. 3, pp. 238-241.

Zakeeruddin et al., "Towards Mediator Design: Characterization of Tris-(4,4'-substituted-2,2'-bipyridine) Complexes of Iron(II), Ruthenium(II) and Osmium(II) as Mediators for Glucose Oxidase of *Aspergillus niger* and Other Redox Proteins," J. Electroanal. Chem. 1992. vol. 337, pp. 253-283.

(Author unknown), "Hemoglobin Function", Ch. 3, pp. 37-60 (date unknown).

\* cited by examiner

BIOLOGICAL FUEL CELL AND METHODS

This application is a continuation of application Ser. No. 13/567,903, filed on Aug. 6, 2012, now U.S. Pat. No. 8,435,682, which is a continuation of application Ser. No. 12/944,551, filed on Nov. 11, 2010, now U.S. Pat. No. 8,241,797, which is a continuation of application Ser. No. 12/876,816, filed on Sep. 7, 2010, now U.S. Pat. No. 7,998,624, which is a continuation of application Ser. No. 11/768,560, filed on Jun. 26, 2007, now U.S. Pat. No. 7,811,689, which is a continuation of application Ser. No. 11/277,696, filed on Mar. 28, 2006, now U.S. Pat. No. 7,238,442, which is a divisional of application Ser. No. 10/385,069, filed on Mar. 10, 2003, now U.S. Pat. No. 7,018,735, which is a continuation of application Ser. No. 09/961,621, filed on Sep. 24, 2001, now U.S. Pat. No. 6,531,239, which is a continuation of application Ser. No. 09/203,227, filed on Nov. 30, 1998, now U.S. Pat. No. 6,294,281, which claims priority to provisional application No. 60/089,900, filed on Jun. 17, 1998.

FIELD OF THE INVENTION

The present invention is, in general, directed to fuel cells and methods of their manufacture and use. More particularly, the present invention relates to fuel cells capable of operation by electrolyzing compounds in a biological system and methods of their manufacture and use.

BACKGROUND OF THE INVENTION

There is interest in a variety of techniques for providing intermittent or continuous electrical power from a power source that utilizes constituents of the environment. In the context of devices implanted in a human or animal, there is a desire to find an energy source that utilizes the body's own chemicals for providing electrical power to the device. This typically includes a mechanism for converting energy stored in chemical compounds in the body to electrical energy. Such devices have been difficult to prepare and implement.

In outdoor situations, solar energy, wind energy, and mechanical vibrations have been used to provide power from the environment. However, because of the diffuse nature of these sources of energy, devices with relatively large footprints are needed to provide the desired energy. Furthermore, these sources of energy are often intermittent and may not be available in all situations. Another potential source of energy is available from chemical energy stored in plants or their residue.

Electrochemical fuel cells have been developed to convert energy stored in chemical compounds to electrical energy. After nearly 50 years of research and development, however, only the hydrogen anode/oxygen cathode fuel cell operates at ambient temperatures. Fuel cells that operate using organic compounds have not been developed, at least in part, because the surfaces of electrocatalysts for the oxidation of organic compounds have not been stabilized. Fouling by intermediate oxidation products, that are strongly bound to the active sites of the catalysts, causes loss of electrocatalyst activity. Thus, there is a need for the development of electrochemical fuel cells that have electrocatalysts that are resistant to fouling and that can operate using compounds found in biological systems.

SUMMARY OF THE INVENTION

Generally, the present invention relates to fuel cells that operate using fuels from biological systems. One embodiment is a fuel cell having an anode and a cathode. Anode enzyme is disposed on the anode and the anode is configured and arranged to electrooxidize an anode reductant in the presence of the anode enzyme. Likewise, cathode enzyme is disposed on the cathode and the cathode is configured and arranged to electroreduce a cathode oxidant in the presence of the cathode enzyme. In addition, anode redox hydrogel may be disposed on the anode to transduce a current between the anode and the anode enzyme and cathode redox hydrogel may be disposed on the cathode to transduce a current between the cathode and the cathode enzyme.

Electrical energy is produced in the fuel cells of the present invention as a biological fluid containing the anode reductant, such as, for example, sugars, alcohols, carboxylic acids, carbohydrates, starches, and cellulose, and the cathode oxidant, such as, for example, $O_2$, flows through the cell. The electrical energy produced by the fuel cell can be stored or used to power an attached device.

Another embodiment of the invention is a method of generating electrical power in a biological system by inserting an anode and a cathode into the biological system. A biochemical anode reductant is electrooxidized on the anode in the presence of an anode enzyme. And a cathode oxidant is electroreduced on the cathode, spaced apart from the anode, in the presence of a cathode enzyme.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
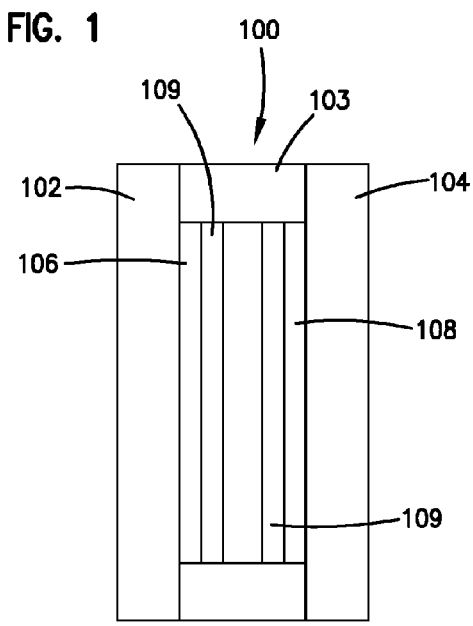
FIG. 1 is a not-to-scale cross-sectional view of one embodiment of a fuel cell, according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to fuel cells and methods of manufacture and use. In particular, the present invention is directed to fuels cells capable of using compounds from biological systems as fuel and methods of manufacture and use. For example, fuel cells can be made that oxidize biochemicals available in the body of an animal, in a plant, or in plant residue. Examples of oxidizable biochemicals include sugars, alcohols, carboxylic acids, carbohydrates, starches, and cellulose. The fuel cell can be implanted in a portion of the animal or plant where a fluid, such as blood or sap, flows or the fuel cell can operate utilizing tissue or fibers, particularly, cellulose, as a fuel. While the present invention is not so limited, an appreciation of various aspects of the invention will be gained through a discussion of the examples provided below.

Fuel Cell

The fuel cells of the invention typically operate using, as fuel, compounds available in a biological system. Fuel cells of the invention can be operated in a variety of biological systems. For example, a fuel cell may be configured for implantation into a person or animal to operate an electrical device, such as a pacemaker, a nerve growth stimulator, a nerve stimulator for relief of chronic pain, a stimulator for regrowth of bone or other tissue, a drug-release valve or microvalve, or a fluid-flow control valve, such as a valve in a duct or in the urinary tract. Another example of a fuel cell for use with a biological system is a fuel cell that provides electricity from a plant, tree, plant residue, or the like. Typically, the fuel cells operate as a biological fluid, such as, for example, blood or sap, flows through the fuel cell. This provides a replenishing source of reactants for the fuel cell.

The fuel for the operation of the fuel cell may be provided by compounds in blood, sap, and other biological fluids or solids. Such compounds may include, for example, sugars, alcohols, carboxylic acids, carbohydrates, starches, cellulose, and dissolved or complexed oxygen (e.g., oxygen complexed with a biomolecule such as hemoglobin or myoglobin). Examples of compounds for electroreduction or electrooxidation in the operation of a fuel cell in an animal include glucose or lactate at the anode and oxygen, dissolved as molecular oxygen or bound in hemoglobin or myoglobin, at the cathode.

A fuel cell 100 of the invention for use in a biological system includes an anode 102 and a cathode 104, as illustrated in FIG. 1. The anode 102 and cathode 104 are separated to avoid shorting. Optionally, separation between the anode 102 and cathode 104 is accomplished using one or more spacers 103. The spacers 103 are often permeable, porous, microporous, and/or fibrous. Alternatively, the spacers 103 may have gaps to allow fluid to flow through the spacers 103. In some embodiments, the spacers 103 may be ion selective membranes. Suitable materials for the spacers 103 include, for example, polyamides (e.g., nylon), polyesters (e.g., Dacron™), a cation exchange membrane (e.g., Nafion™), an anion exchange membrane, porous polyolefins, polyimides, polyethers, and polyurethanes.

An anode electrolysis layer 106 is formed on at least a portion of the anode 102.

The anode electrolysis layer 106 typically includes an anode redox polymer and an anode enzyme. Likewise, the cathode 104 has a cathode electrolysis layer 108, typically including a cathode redox polymer and a cathode enzyme, formed on at least a portion of the cathode 104. More than one redox polymer and/or more than one enzyme can be used in each electrolysis layer. In some embodiments, the anode electrolysis layer 106 and/or cathode electrolysis layer 108 are covered by a non-fouling coating 109.

The enzyme in each electrolysis layer typically catalyzes an electrochemical reaction of a cathode oxidant or anode reductant. Usually, the anode reductant is electrooxidized at the anode 102 and the cathode oxidant is electroreduced at the cathode 104. The redox polymer transduces a current between the cathode oxidant or anode reductant and the respective electrode. In general, the cathode oxidant and anode reductant are provided within the biological system. In one embodiment, the cathode oxidant is oxygen and the anode reductant includes sugars, alcohols, and/or carboxylic acids. The fuel cell optionally includes enzymes that break down more complex molecules, such as, for example, starches and cellulose, into simpler components, such as sugars, alcohols, and/or carboxylic acids.

The physical dimensions, as well as the operational parameters, such as the output power and voltage, are, at least in part, a function of the components of the fuel cell. The open circuit voltage of the fuel cell can range from, for example, 0.5 volts to 1.2 volts, however, the fuel cells of the invention can also produce larger or smaller voltages. The voltage at the maximum power point can range from, for example, 0.4 to 0.8 volts. In addition, two or more fuel cells may be combined in series and/or in parallel to form a composite fuel cell with a larger voltage and/or current. The volumetric output power density of the fuel cell can range from, for example, about 0.5 $mW/cm^3$ to about 5 $W/cm^3$, however, fuel cells can also be formed with higher or lower volumetric output power density. The gravimetric output power density can range from, for example, about 5 mW/g to about 50 W/g, however, fuel cells can also be formed with higher or lower gravimetric output power density. The output power density depends on the flow of fluid through the fuel cell. Generally, increasing the rate of flow increases the output power density.

Electrodes

Figure 2:
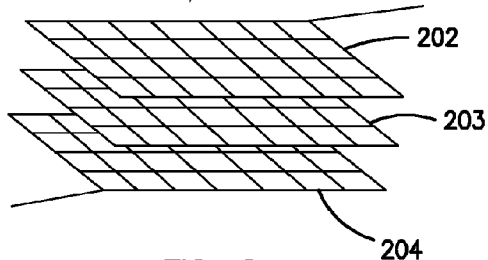
FIG. 2 is a perspective view of a second embodiment of a fuel cell, according to the invention.
Figure 3:
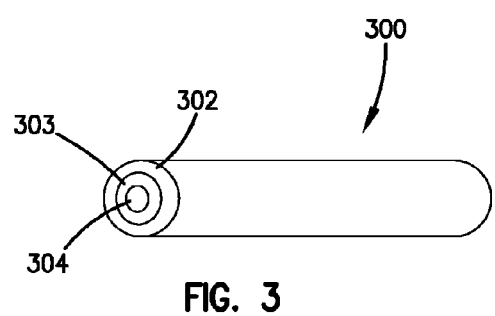
FIG. 3 is a perspective view of a third embodiment of a fuel cell, according to the invention.

The anode 102 and cathode 104 can have a variety of forms and be made from a variety of materials. For example, the anode and/or cathode can be formed as plates (as shown in FIG. 1), mesh (as shown in FIG. 2), tubes (as shown in FIG. 3), or other shapes of conductive material. The anode and/or cathode can also be a conductive film formed over an inert non-conducting base material formed in the shape of, for example, a plate, tube, or mesh. The conductive films can be formed on the non-conducting base material by a variety of methods, including, for example, sputtering, physical vapor deposition, plasma deposition, chemical vapor deposition, screen printing, and other coating methods.

The anode 102 and cathode 104 are formed using a conductive material, such as, for example, metal, carbon, conductive polymer, or metallic compound. Suitable conductive materials are typically non-corroding and can include, for example, gold, vitreous carbon, graphite, platinum, ruthenium dioxide, and palladium, as well as other materials known to those skilled in the art. Suitable non-conducting base materials for use with a conductive film include plastic and polymeric materials, such as, for example, polyethylene, polypropylene, polyurethanes, and polyesters. It will be understood that the anode 102 and cathode 104 of any particular embodiment are not necessarily made using the same materials.

The conductive material and/or the optional non-conducting base material are often porous or microporous. For example, the conductive material and/or the optional non-conducting base material may be formed, for example, as a mesh, a reticulated structure (e.g., reticulated graphite), a microporous film, or a film that is permeable to the anode reductant and/or cathode oxidant. The surface area of the electrode can also be increased by roughening. Preferably, the actual exposed surface area of the anode and/or cathode is larger than the macroscopic geometric surface area because the anode and/or cathode are reticulated, mesh, roughened, porous, microporous, and/or fibrous. In addition, the conductive material and/or the optional non-conducting base material can be an ion selective membrane.

FIGS. 1 to 5 illustrate a few of the possible configurations for the anode 102 and cathode 104. The anode 102 and cathode 104 can be formed as plates and separated by optional non-conducting spacers 103, as illustrated in FIG. 1. The plates can be, for example, permeable or non-permeable plates of conductive material that are optionally formed on a base material. The fuel cell 100 may be configured, for example, so that biological fluid flows through and/or between the spacers 103 and then between the anode 102 and the cathode 104, or the fuel cell 100 may be configured so that biological fluid flows through a permeable anode 102 and permeable cathode 104.

Another embodiment of a fuel cell 200 includes an anode 202 and a cathode 204 formed out of a woven or mesh material, as shown in FIG. 2. The anode 202 and cathode 204 can be separated by a woven or mesh non-conducting spacer 203.

Yet another embodiment of a fuel cell 300 includes an anode 302 and a cathode 304 formed as tubes and separated by an optional non-conducting spacer 303, as shown in FIG. 3. The anode 302 and cathode 304 of this fuel cell 300 are formed, for example, using a permeable or mesh material to allow flow of a biological fluid through the anode 302 and/or cathode 304. As an alternative, the fuel cell 300 may be configured for fluid flow between or through the spacers 303 and between the anode 302 and cathode 304. In addition, instead of individual tubes, the anode 302 and cathode 304 may form spirals.

Figure 4:
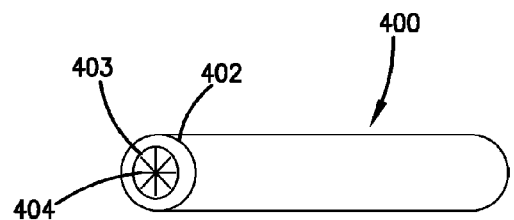
FIG. 4 is a perspective view of a fourth embodiment of a fuel cell, according to the invention.

Another embodiment of a fuel cell 400 includes a tubular anode 402 with one or more planar cathode plates 404 in the center, as shown in FIG. 4. The tubular anode 402 and planar cathode plates 404 may be separated by an optional tubular spacer 403. Again, the fuel cell 400 may be configured, for example, so that biological fluid flows through a permeable anode and cathode or so that biological fluid flows between the anode and/or cathode. One alternative embodiment has a tubular cathode with one or more intersecting planar anode plates at the center.

Figure 5:
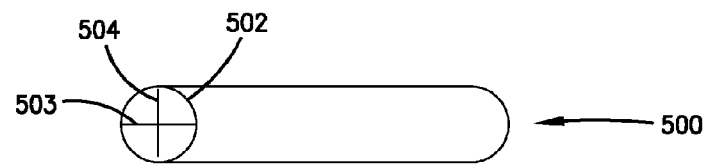
FIG. 5 is a perspective view of a fifth embodiment of a fuel cell, according to the invention.

Another embodiment of a fuel cell 500 includes a tubular anode 502 with a planar cathode plate 504 at the center and a wider planar spacer 503 intersecting the cathode plate 504 and positioned within the tubular anode 502 to keep the cathode plate 504 and tubular anode 502 spaced apart, as shown in FIG. 5. Again, the fuel cell 500 may be configured, for example, so that biological fluid flows through a permeable anode and/or cathode or so that biological fluid flows between the anode and cathode. One alternative embodiment has a tubular cathode with a planar anode plate at the center.

Redox Polymers

Water, which is typically the primary mass transporting medium in many biological systems, is an electrical insulator. Although the solubility of many compounds is high in water, these compounds can not be electrolyzed in the absence of transport of electrons through the aqueous medium. This can be accomplished using a redox polymer, and particularly a redox hydrogel. Redox polymers generally provide for adequate transport of electrons if the redox polymer includes active redox functional groups that are mobile and can carry electrons between the analyte and the electrode. For example, a redox hydrogel typically contains a large amount of water. Water soluble reactants and products often permeate through the redox hydrogel nearly as fast as they diffuse through water. Electron conduction in the redox hydrogel is through electron exchange between polymer segments that are mobile after the polymer is hydrated.

The anode redox polymer and cathode redox polymer are deposited on the anode 104 and cathode 102, respectively. In general, the redox polymers include electroreducible and electrooxidizable ions, functionalities, species, or molecules having redox potentials. Preferably, these redox potentials are well-defined. The redox potentials of the redox hydrogels are typically within a range at which water is neither electrooxidized or electroreduced. At neutral pH and 25° C., this range is from about (−)0.65 V to about (+) 0.58 V versus the standard calomel electrode (SCE) (i.e., from about (−)0.42 V to about (+)0.81 V versus the standard hydrogen electrode (SHE)). The preferred range of the redox potential for the anode redox polymer is from about −0.65 V to about +0.05 V (SCE). The preferred range of the redox potential for the cathode redox polymer is from about +0.3 V to about +0.7 V (SCE).

The preferred redox polymers include a redox species bound to a polymer which can in turn be immobilized on the working electrode. In general, redox polymers suitable for use in the invention have structures or charges that prevent or substantially reduce the diffusional loss of the redox species during the period of time that the sample is being analyzed. The bond between the redox species and the polymer may be covalent, coordinative, or ionic. Examples of useful redox polymers and methods for producing them are described in U.S. Pat. Nos. 5,262,035; 5,262,305; 5,320,725; 5,264,104; 5,264,105; 5,356,786; 5,593,852; and 5,665,222, incorporated herein by reference. Although any organic or organometallic redox species can be bound to a polymer and used as a redox polymer, the preferred redox species is a transition metal compound or complex. The preferred transition metal compounds or complexes include osmium, ruthenium, iron, and cobalt compounds or complexes. In the preferred complexes, the transition metal is coordinatively bound to one or more ligands and covalently bound to at least one other ligand. The ligands are often mono-, di-, tri-, or tetradentate. The most preferred ligands are heterocyclic nitrogen compounds, such as, for example, pyridine and/or imidazole derivatives. For example, the multidentate ligands typically include multiple pyridine and/or imidazole rings. Alternatively, polymer-bound metallocene derivatives, such as, for example, ferrocene, can be used. An example of this type of redox polymer is poly(vinylferrocene) or a derivative of poly(vinylferrocene) functionalized to increase swelling of the redox polymer in water.

Another type of redox polymer contains an ionically-bound redox species. Typically, this type of mediator includes a charged polymer coupled to an oppositely charged redox species. Examples of this type of redox polymer include a negatively charged polymer such as Nafion® (DuPont) coupled to multiple positively charged redox species such as an osmium or ruthenium polypyridyl cations. Another example of an ionically-bound mediator is a positively charged polymer such as quaternized poly(4-vinyl pyridine) or poly(1-vinyl imidazole) coupled to a negatively charged redox species such as ferricyanide or ferrocyanide. The preferred ionically-bound redox species is a multiply charged, often polyanionic, redox species bound within an oppositely charged polymer.

In another embodiment of the invention, suitable redox polymers include a redox species coordinatively bound to a polymer. For example, the mediator may be formed by coordination of an osmium, ruthenium, or cobalt 2,2'-bipyridyl complex to poly(1-vinyl imidazole) or poly(4-vinyl pyridine) or by co-polymerization of, for example, a 4-vinyl-2,2'-bipyridyl osmium, ruthenium, or cobalt complex with 1-vinyl imidazole or 4-vinylpyridine.

Examples of other redox species include stable quinones and species that in their oxidized state have quinoid structures, such as Nile blue and indophenol. A preferred tetrasubstituted quinone usually has carbon atoms in the positions neighboring the oxygen-containing carbon.

The preferred redox species are osmium or ruthenium transition metal complexes with one or more ligands, each ligand having one or more nitrogen-containing heterocycles. Examples of such ligands include pyridine, imidazole rings, and ligands that include two or more pyridine and/or imidazole rings such as, for example, 2,2'-bipyridine; 2,2',2"-terpyridine; 1,10-phenanthroline; ligands having the following structures:

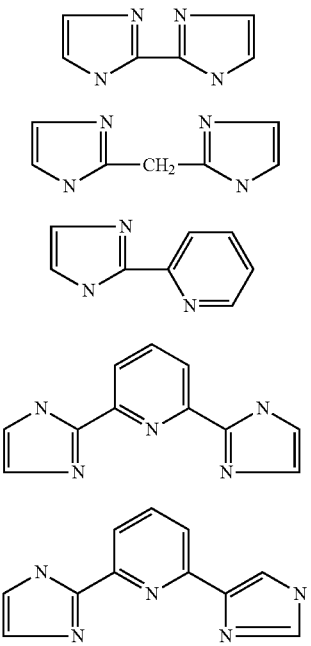

and derivatives thereof.

Suitable derivatives of these ligands include, for example, the addition of alkyl, alkoxy, vinyl, allyl, vinylester, and acetamide functional groups to any of the available sites on the heterocyclic ring, including, for example, on the 4-position (i.e., para to nitrogen) of the pyridine rings or on one of the nitrogen atoms of the imidazole. Typically, the alkyl, alkoxy, vinyl, and acetamide functional groups are C1 to C6 and, preferably, C1 to C3 functional groups (referring to the number of carbon atoms in the functional group). Suitable derivatives of 2,2'-bipyridine for complexation with the osmium cation include, for example, mono-, di-, and poly-alkyl-2,2'-bipyridines, such as 4,4'-dimethyl-2,2'-bipyridine, and mono-, di-, and polyalkoxy-2,2'-bipyridines, such as 4,4'-dimethoxy-2,2'-bipyridine. Suitable derivatives of 1,10-phenanthroline for complexation with the osmium cation include, for example, mono-, di-, and polyalkyl-1,10-phenanthrolines, such as 4,7-dimethyl-1,10-phenanthroline, and mono-, di-, and polyalkoxy-1,10-phenanthrolines, such as 4,7-dimethoxy-1,10-phenanthroline. Suitable derivatives for 2,2',2"-terpyridine include, for example, mono-, di-, tri-, and polyalkyl-2,2',2"-terpyridines, such as 4,4',4"-trimethyl-2,2',2"-terpyridine, and mono-, di-, tri-, and polyalkoxy-2,2',2"-terpyridines, such as 4,4',4"-trimethoxy-2,2',2"-terpyridine. Typically, the alkyl and alkoxy groups are C1 to C6 alkyl or alkoxy, and, preferably, C1 to C3 alkyl or alkoxy.

Suitable redox species include, for example, osmium cations complexed with (a) two bidentate ligands, such as 2,2'-bipyridine, 1,10-phenanthroline, or derivatives thereof (the two ligands not necessarily being the same), (b) one tridentate ligand, such as 2,2',2"-terpyridine and 2,6-di(imidazol-2-yl)-pyridine, or (c) one bidentate ligand and one tridentate ligand. Suitable osmium transition metal complexes include, for example, $[(bpy)_2OsCl]^{+/2+}$, $[(dimet)_2OsCl]^{+/2+}$, $[(dmo)_2OsCl]^{+/2+}$, $[terOsCl_2]^{0/+}$, $[trimetOsCl_2]^{0/+}$, and $[(ter)(bpy)Os]^{2+/3+}$ where bpy is 2,2'-bypyridine, dimet is 4,4'-dimethyl-2,2'-bipyridine, dmo is 4,4'-dimethoxy-2,2'-bipyridine, ter is 2,2',2"-terpyridine, and trimet is 4,4',4"-trimethyl-2,2',2"-terpyridine.

The redox species often exchange electrons rapidly between each other and the electrode so that the complex can be rapidly oxidized and/or reduced. In general, iron complexes are more oxidizing than ruthenium complexes, which, in turn, are more oxidizing than osmium complexes. In addition, the redox potential generally increases with the number of coordinating heterocyclic rings.

Typically, the polymers used for the redox polymers have nitrogen-containing heterocycles, such as pyridine, imidazole, or derivatives thereof for binding as ligands to the redox species. Suitable polymers for complexation with redox species, such as the transition metal complexes, described above, include, for example, polymers and copolymers of poly(1-vinyl imidazole) (referred to as "PVI") and poly(4-vinyl pyridine) (referred to as "PVP"), as well as polymers and copolymer of poly(acrylic acid) or polyacrylamide that have been modified by the addition of pendant nitrogen-containing heterocycles, such as pyridine and imidazole. Modification of poly(acrylic acid) may be performed by reaction of at least a portion of the carboxylic acid functionalities with an aminoalkylpyridine or aminoalkylimidazole, such as 4-ethylaminopyridine, to form amides. Suitable copolymer substituents of PVI, PVP, and poly(acrylic acid) include acrylonitrile, acrylamide, acrylhydrazide, and substituted or quaternized N-vinyl imidazole. The copolymers can be random or block copolymers.

The transition metal complexes typically covalently or coordinatively bind with the nitrogen-containing heterocycles (e.g., imidazole and/or pyridine) of the polymer. Alternatively, the transition metal complexes may have vinyl functional groups through which the complexes can be co-polymerized with vinylic heterocycles, amides, nitriles, carboxylic acids, sulfonic acids, or other polar vinylic compounds, particularly, for those compounds whose polymer is known to dissolve or swell in water.

Typically, the ratio of osmium or ruthenium transition metal complex to imidazole and/or pyridine groups ranges from 1:10 to 1:1, preferably from 1:2 to 1:1, and more preferably from 3:4 to 1:1. Generally, the redox potentials of the hydrogels depend, at least in part, on the polymer with the order of redox potentials being poly(acrylic acid)<PVI<PVP.

A variety of methods may be used to immobilize a redox polymer on an electrode surface. One method is adsorptive immobilization. This method is particularly useful for redox polymers with relatively high molecular weights. The molecular weight of a polymer may be increased, for example, by cross-linking. The polymer of the redox polymer may contain functional groups, such as, for example, hydrazide, amine, alcohol, heterocyclic nitrogen, vinyl, allyl, and carboxylic acid groups, that can be crosslinked using a crosslinking agent. These functional groups may be provided on the polymer or one or more of the copolymers. Alternatively or additionally, the functional groups may be added by a reaction, such as, for example, quaternization. One example is the quaternization of PVP with bromoethylamine groups.

Suitable cross-linking agents include, for example, molecules having two or more epoxide (e.g., poly(ethylene glycol) diglycidyl ether (PEGDGE)), aldehyde, aziridine, alkyl halide, and azide functional groups or combinations thereof. Other examples of cross-linking agents include compounds that activate carboxylic acid or other acid functional groups for condensation with amines or other nitrogen compounds. These cross-linking agents include carbodiimides or compounds with active N-hydroxysuccinimide or imidate functional groups. Yet other examples of cross-linking agents are quinones (e.g., tetrachlorobenzoquinone and tetracyanoquinodimethane) and cyanuric chloride. Other cross-linking agents may also be used. In some embodiments, an additional cross-linking agent is not required. Further discussion and examples of cross-linking and cross-linking agents are found in U.S. Pat. Nos. 5,262,035; 5,262,305; 5,320,725; 5,264,104; 5,264,105; 5,356,786; and 5,593,852, herein incorporated by reference.

In another embodiment, the redox polymer is immobilized by the functionalization of the electrode surface and then the chemical bonding, often covalently, of the redox polymer to the functional groups on the electrode surface. One example of this type of immobilization begins with a poly(4-vinylpyridine). The polymer's pyridine rings are, in part, complexed with a reducible/oxidizable species, such as $[Os(bpy)_2Cl]^{+/2+}$ where bpy is 2,2'-bipyridine. Part of the pyridine rings are quaternized by reaction with 2-bromoethylamine. The polymer is then crosslinked, for example, using a diepoxide, such as poly(ethylene glycol) diglycidyl ether.

Carbon surfaces can be modified for attachment of a redox species or polymer, for example, by electroreduction of a diazonium salt. As an illustration, reduction of a diazonium salt formed upon diazotization of p-aminobenzoic acid modifies a carbon surface with phenylcarboxylic acid functional groups. These functional groups can be activated by a carbodiimide, such as 1-ethyl-3-(3-dimethylaminopropyl)-carbodiimide hydrochloride (EDC). The activated functional groups are bound with a amine-functionalized redox couple, such as, for example, the quaternized osmium-containing redox polymer described above or 2-aminoethylferrocene, to form the redox couple.

Similarly, gold and other metal surfaces can be functionalized by, for example, an amine, such as cystamine, or by a carboxylic acid, such as thioctic acid. A redox couple, such as, for example, $[Os(bpy)_2(pyridine-4-carboxylate)Cl]^{0/+}$, is activated by 1-ethyl-3-(3-dimethylaminopropyl)-carbodiimide hydrochloride (EDC) to form a reactive O-acylisourea which reacts with the gold-bound amine to form an amide. The carboxylic acid functional group of thioctic acid can be activated with EDC to bind a polymer or protein amine to form an amide.

Enzymes

The enzymes of the anode and cathode electrolysis layers catalyze an electrochemical reaction of an anode reductant or cathode oxidant, respectively. Typically, different enzymes are provided in the anode and cathode electrolysis layers. In some embodiments, more than one enzyme is provide in the anode and/or cathode electrolysis layers. A variety of enzymes are useful including, for example, laccase and cytochrome C oxidase on the cathode for electroreduction of oxygen; peroxidases on the cathode for electroreduction of hydrogen peroxide; oxidases and dehydrogenases on the anode for electrooxidation of glucose, lactate, and other biochemicals; pyranose oxidase on the anode for electrooxidation of D-glucose, L-sorbose, and D-xylose; and glucose oxidase, oligosaccharide dehydrogenase, or pyrroloquinoline quinone (PQQ) glucose dehydrogenase on the anode for electrooxidation of glucose. These enzymes, preferably, do not include leachable co-factors, such as $NAD^+$ and $NADP^+$. Other enzymes may also be included, particularly on or near the anode, to convert more complex molecules, such as starches and cellulose, into sugars, alcohols, and/or carboxylic acids.

One category of suitable enzymes includes thermostable enzymes which are defined herein, unless otherwise indicated, as enzymes that function for one day, and, preferably, for five days, or more at 37° C., losing 10% or less, and, preferably, 5% or less, of their activity over the period of use. Examples of thermostable enzyme include laccase from the thermophilic fungus *myceliophthora thermophilic*, cytochrome C perioxidases from thermophilic bacterium PS3 and *thermus thermophilus*, peroxidase from soybean, and pyranose oxidase from the white rot fungus *phlebiopsis gigantea*. Other commercially available thermostable enzymes include L-lactate dehydrogenase from *bacillus*, malate dehydrogenase from thermus species (expressed in *E. coli*), glucose oxidase from *aspergillus*, microbial pyruvate oxidase, and urate oxidase from *bacillus*. Thermostable enzymes that hydrolyze larger biological molecules into electrooxidizable sugars include, for example, α-amylase from *bacillus stearothermophilus*, β-amylase from *aspergillus*, glucan-1,4-α-glucosidase from *rhizopus niveus*, cellulase from *aspergillus niger*, endo-1-3(4)-β-glucanase from *aspergillus niger*, dextranase from *leuconostoc mesenteroides*, α-glucosidase from *bacillus stearothermophilus*, β-glucosidase from *caldocellum saccharolyticum*, β-galactosidase from *aspergillus*, β-fructofuranosilidase from yeast, and lactase from *aspergillus oryzae*.

Alternatively, the enzyme is immobilized in a non-conducting inorganic or organic polymeric matrix to increase the thermostablity of the enzyme. Discussion regarding immobilization of an enzyme in an inorganic polymeric matrix is found in U.S. patent application Ser. No. 08/798,596, now issued as U.S. Pat. No. 5,972,199, and PCT Patent Application No. US98/02403, now published as PCT Publication WO 98/35053, incorporated herein by reference. A sol-gel polymerization process provides a method for the preparation of an inorganic polymeric matrix (e.g., glass) by the polymerization of suitable monomers at or near room-temperature. Suitable monomers include, for example, alkoxides and esters of metallic and semiconducting elements, with preferred metallic and semiconducting elements including Si, Al, Ti, Zr, and P. The most preferred monomers include silicon and have a silicon to oxygen ratio from about 1:2 to about 1:4.

For example, enzymes can be immobilized in silica polymeric matrices made by sol-gel processes, such as the hydrolysis of tetramethoxysilane or another polyalkoxysilane that contains one or more silicon atoms. Condensation of the resulting silanol in the presence of the enzyme results in entrapment of the enzyme. This process has been referred to as sol-gel immobilization. Binding of enzymes in silica or other inorganic polymeric matrices formed from sol-gels can stabilize the enzyme. Entrapment of glucose oxidase, a glycoprotein, in a silica sol-gel matrix greatly improves the stability of the enzyme, which retains activity when heated in water to 98° C. for 10 minutes.

An enzyme stabilized by the silica sol gel matrix can be ground to a fine powder and dispersed in a silicone, preferably in an elastomeric silicone, and most preferably in a water-based elastomeric silicone precursor. This dispersion is then applied to the cathode as a binder of the enzyme. The binder preferably includes material to extract and store oxygen from the environment. Silicone is a preferred binder in this layer due to its ability to dissolve oxygen and its oxygen permeability. Elastomeric silicones are preferred because of high oxygen solubility.

The stability of an enzyme in an inorganic polymeric matrix depends, at least in part, on the ionic characteristics of the enzyme and those of the immobilizing, often inorganic, polymeric matrix. A hydrated silica gel has an isoelectric point (pI) (i.e., the pH at which the net charge on the molecule is zero) near pH 5. Glucose oxidase, with pI=3.8, retained its activity upon sol-gel immobilization and was stabilized when immobilized in the hydrated silica gel matrix so that the half-life of the enzyme was increased by about 200-fold at 63° C. Lactate oxidase (pI=4.6) and glycolate oxidase (pI≈9.6), on the other hand, each lost at least 70% of their activity upon immobilization in a hydrated silica gel and the stability of these two enzymes was not greatly improved.

In contrast to the loss of activity of these enzymes in hydrated silica alone, when poly(1-vinyl imidazole) (PVI) (a weak base) or poly(ethyleneimine) (PEI) (a stronger base) was used to form an adduct in the hydrated silica gel, the half-life of lactate oxidase (pI=4.6) increased more than 100-fold at 63° C. and the enzyme was immobilized without significant loss of activity. The adduct can be formed by, for example dissolving lactate oxidase in an aqueous buffer solution in which poly(1-vinyl imidazole) is co-dissolved, and the lactate oxidase-poly(1-vinyl imidazole) mixture is immobilized in silica by the sol-gel process, a stable, immobilized lactate oxidase is obtained. The stabilized lactate oxidase can be heated in water to 90° C. for 10 minutes and still retain enzymatic activity. A similar adduct which retains enzymatic activity can be formed with poly(ethyleneimine).

Formation of an adduct between glycolate oxidase (pI≈9.6) and poly(1-vinyl imidazole) (a weak base) did not improve the stability of the enzyme, but the formation of an adduct between glycolate oxidase (pI≈9.6), and poly(ethylene imine) (a stronger base) increased the half-life of glycolate oxidase more than 100-fold at 60° C. Forming an adduct between glucose oxidase pI=3.8 and PVI or PEI did not further improve the stability of the enzyme after its immobilization in hydrated silica.

It is thought that these functionally essential, positively charged surface residues (e.g., arginine) of the lactate and glycolate oxidases may interact with negatively charged polysilicate anions of the hydrated silica, resulting in a decrease in activity upon sol-gel immobilization. However, when the enzyme surface is enveloped by a flexible polycation buffer (i.e., PVI and/or PEI, depending on the isoelectric point of the enzyme) then the polysilicate anions interact with the cationic buffer molecules, and not with the cationic residues of the enzyme, thereby stabilizing the enzyme by encasement in the silica gel. Thus, it is thought that PVI and PEI form adducts, acting as polycationic buffers for enzymes such as lactate oxidase. PEI also acts as a cationic buffer for enzymes such as glycolate oxidase. It is thought that PVI is not an effective buffer for glycolate oxidase, because glycolate oxidase is a stronger base.

In general, the addition of a polycation, such as, for example, poly(1-vinyl imidazole) or poly(ethyleneimine), prior to sol-gel immobilization stabilizes the enzyme. Preferably, the added polycation is a more basic polyelectrolyte than the enzyme. Enzymes with high isoelectric points often need more basic polyelectrolytes for stabilization. Poly(ethyleneimine) is more basic than poly(1-vinyl imidazole).

Poly(1-vinyl imidazole), a polycation at pH 7, binds at this pH to enzymes such as lactate oxidase, that are polyanions at pH 7. Thus, the addition of a particular polymer to a particular enzyme can greatly increase the stability the enzyme. In the case of lactate oxidase, addition of poly(ethyleneimine), also a polybasic polymer and also multiply protonated at pH 7, in place of poly(1-vinyl imidazole) improved stability of the enzyme, although not as much as the addition of the preferred polymer, poly(1-vinyl imidazole). The stabilized enzyme can then be used at higher temperatures and/or for longer durations than would be possible if the enzyme were immobilized alone in the sol-gel.

The sol gel matrix in which an enzyme is immobilized and stabilized is often not an electron conductor. The matrix can be modified by binding, often through covalent bonds, a redox functional group to the matrix or its precursor. Examples of suitable redox functional groups include the redox species described above for use in the redox polymer, including, for example, osmium, ruthenium, and cobalt complexes having ligands including one or more pyridine and/or imidazole rings. Moreover, the redox functional group preferably includes a spacer arm covalently or coordinatively attached a metal cation of the redox functional group or one of the ligands. One end of the spacer arm is covalently linked to, for example, silicon atoms of the matrix. The other end of the spacer arm is covalently or coordinatively linked to the redox functional group. The enzyme can be immobilized in such a matrix and electrons can be exchanged between the enzyme and the electrode using the redox functional group coupled to the matrix.

In some embodiments, non-corroding, electron-conducting particles are disposed within the matrix to increase the conductivity of the matrix; particularly, for those matrices that include attached redox functional groups. Examples of such particles include graphite, carbon black, gold, and ruthenium dioxide. Typically, these particles have a diameter of 1 μm or less and a surface area of 1 $m^2/g$ or more, preferably, 10 $m^2/g$ or more, and, more preferably, 100 $m^2/g$ or more. Alternatively, $VOCl_3$ can be hydrolyzed to form a polymeric matrix, that, when reduced, is conducting.

In other embodiments, an enzyme is immobilized and stabilized in a sol gel matrix and the enzyme catalyzes a reaction of a chemical to form a product that is subsequently electrooxidized or electroreduced in the presence of a second enzyme that is electrically coupled to an electrode. For example, glucose can react in the presence of glucose oxidase that is stabilized in a sol gel matrix to form gluconolactone and hydrogen peroxide. The hydrogen peroxide diffuses out of the sol gel matrix to the proximity of the cathode and is electroreduced to water by a thermostable enzyme, such as soybean peroxidase.

Anode

At a preferred anode, one or more sugars, alcohols, and/or carboxylic acids, typically found in the biological system, are electrooxidized. Preferred anode enzymes for the electrooxidation of the anode reductant include, for example, PQQ glucose dehydrogenase, glucose oxidase, galactose oxidase, PQQ fructose dehydrogenase, quinohemoprotein alcohol dehydrogenase, pyranose oxidase, oligosaccharide dehydrogenase, and lactate oxidase.

One embodiment of the anode is formed using a high surface area graphite fiber/carbon black electrode using polypropylene or polytetrafluoroethylene (e.g., Teflon™) as a binder. The anode redox polymer and anode enzyme are then disposed on the anode.

The anode potential can be limited by the (a) redox potential of the anode enzyme, (b) the concentration of the anode reductant at the anode, and (c) the redox potential of the anode redox polymer. Reported redox potentials for known anode enzymes range from about −0.4 V to about −0.5 V versus the standard calomel electrode (SCE). Typically, the preferred anode redox polymers have a redox potential that is at least about 0.1 V positive of the redox potential of the anode enzyme. Thus, the preferred anode redox polymer can have a redox potential of, for example, about −0.3 V to −0.4 V (SCE), however, the potential of the anode redox polymer may be higher or lower depending, at least in part, on the redox potential of the anode redox enzyme. Preferred anode redox polymers for the anode include $[(dmo)_2OsCl]^{+/2+}$, $[terOsCl_2]^{0/+}$, and $[trimetOsCl_2]^{0/+}$ coupled to either PVI or poly(acrylic acid) or a copolymer of 4-vinyl pyridine or 1-vinyl imidazole.

In some embodiments, one or more additional enzymes are provided in proximity to or disposed on the anode. The additional enzyme or enzymes break down starch, cellulose, poly- and oligosaccharides, disaccharides, and trisaccharides into the sugars, alcohols, and/or carboxylic acids that are used as fuel. Examples of such catalysts include α-amylase from *bacillus stearothermophilus*, β-amylase from *aspergillus*, glucan-1,4-α-glucosidase from *rhizopus niveus*, cellulase from *aspergillus niger*, endo-1-3(4)-β-glucanase from *aspergillus niger*, dextranase from *leuconostoc mesenteroides*, α-glucosidase from *bacillus stearothermophilus*, β-glucosidase from *caldocellum saccharolyticum*, β-galactosidase from *aspergillus*, β-fructofuranosilidase from yeast, and lactase from *aspergillus oryzae*.

Cathode

In one embodiment of the fuel cell, the cathode reduces gaseous $O_2$ that is typically dissolved in the biological fluid or originating from the air. In another embodiment of the fuel cell, hydrogen peroxide is formed in a non-enzyme-catalyzed electrode reaction or in an enzyme-catalyzed reaction on or off the cathode and then the hydrogen peroxide is electroreduced at the cathode. Preferred cathode enzymes for the reduction of $O_2$ and $H_2O_2$ include, for example, tyrosinase, horseradish peroxidase, soybean peroxidase, other peroxidases, laccases, and/or cytochrome C peroxidases.

One embodiment of the cathode includes a porous membrane formed over at least a portion of cathode. The porous membrane has an $O_2$ or $H_2O_2$ permeable, hydrophobic outer surface and an $O_2$ or $H_2O_2$ permeable hydrophilic inner surface. In another embodiment, the cathode includes an outer layer of a hydrophobically modified porous silicate carbon composite, formed of an alkyltrialkoxysilane precursor, and carbon black. The inner layer is a hydrophilic silca-carbon composite. In another embodiment, the electrode is a microporous Teflon PTFE bound acetylene/carbon black electrode. The inner surface is plasma processed to make it hydrophilic. The redox polymer and enzyme are deposited on the inner surface of the cathode. When the cathode is exposed to $O_2$ originating in blood or a body fluid, the cathode may only include hydrophilic surfaces in contact with the $O_2$ transporting biological fluid.

The cathode potential can be limited by the (a) redox potential of the cathode enzyme, (b) the concentration of the cathode oxidant at the cathode, and (c) the redox potential of the cathode redox polymer. Reported redox potentials for known $O_2$ reducing enzymes range from about +0.3 V to about +0.6 V versus the standard calomel electrode (SCE). Typically, the preferred cathode redox polymer has a redox potential that is at least about 0.1 V negative of the redox potential of the enzyme. Thus, the preferred redox polymer has redox potential of, for example, about +0.4 to +0.5 V (SCE), however, the potential of the cathode redox polymer may be higher or lower depending, at least in part, on the redox potential of the cathode redox enzyme.

For osmium complexes used as the cathode redox polymer, typically, at least four, usually, at least five, and, often, all six of the possible coordination sites of the central osmium atom are occupied by nitrogen atoms. Alternatively, for complexes of ruthenium used as the cathode redox polymer, typically, four or fewer, and, usually, three or fewer of the possible coordination sites are nitrogen occupied. Preferred cathode redox polymers include $[(ter)(bpy)Os]^{2+/3+}$ coupled to PVI or PVP.

Non-fouling Coatings

An optional non-fouling coating is formed over at least that portion of the electrodes of the fuel cell. The non-fouling coating prevents or retards the penetration of macromolecules, such as proteins, having a molecular weight of 5000 daltons or more, into the electrodes of the fuel cell. This can be accomplished using a polymeric film or coating having a pore size that is smaller than the biomolecules that are to be excluded or having anionic and/or cationic functional groups that repel cationic or anionic macromolecules, respectively. Such biomolecules may foul the electrodes and/or the electrolysis layer thereby reducing the effectiveness of the fuel cell and altering the expected electrical power generation. The fouling of the electrodes may also decrease the effective life of the fuel cell.

For example, the electrodes of the fuel cell may be completely or partially coated on their exterior with a non-fouling coating. A preferred non-fouling coating is a polymer, such as a hydrogel, that contains at least 20 wt. % fluid when in equilibrium with the analyte-containing fluid. Examples of suitable polymers are described in U.S. Pat. No. 5,593,852, incorporated herein by reference, and include crosslinked polyethylene oxides, such as polyethylene oxide tetraacrylate and diacrylate. For example, polyethylene oxide ("PEO") chains, typically of 8-18 kilodaltons are terminally modified with reactive groups, such as acrylates and methacrylates. In addition, diesters of PEO can be reacted with star-dendrimer PEO polyamines to form the non-fouling coatings.

Implantation in a Blood Vessel

For continuously producing power, the reactant-carrying fluid typically flows through the fuel cell, so as to replenish the anode reductant and/or cathode oxidant exhausted by reacting at the anode and/or cathode, respectively. When the fuel cell is implanted in a blood vessel of an animal (e.g., human, mammal, bird, or fish), the fluid may be pumped through the fuel cell by the heart, obviating any need for a mechanical pump and thereby reducing the weight and volume of the system containing the fuel cell.

Use and Storage of Electrical Power Generated by the Fuel Cell

The electrical power generated by the fuel cell can be used to operate a variety of devices, including, for example, medical or other devices implanted in a human or animal. Examples of medical devices include pacemakers, nerve growth stimulators, nerve stimulators for relief of chronic pain, stimulators for regrowth of bone or other tissue, drug-release valves or microvalves, and fluid-flow control valves, such as a valve in a duct or in the urinary tract. The electrical power can also be used to operate external devices connected to the fuel cell (e.g., a fuel cell implanted in a plant or tree). In addition, the electrical power can be stored in a storage device, such as a capacitive storage element or battery, for later use.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed:

1. An electrochemical cell for positioning in a biological system comprising oxygen, comprising:

a substrate comprising a first face and a second face;
an anode disposed on the first face of the substrate, wherein the anode comprises an anode enzyme and a mediator, wherein the enzyme and the mediator are crosslinked; and
a cathode disposed on the second face of the substrate.

2. The electrochemical cell according to claim 1, wherein the mediator is a metallocene derivative.

3. The electrochemical cell according to claim 2, wherein the metallocene derivative is ferrocene.

4. The electrochemical cell according to claim 1, wherein the mediator comprises a transition metal complex.

5. The electrochemical cell according to claim 4, wherein the transition metal complex comprises ruthenium or osmium.

6. The electrochemical cell according to claim 1, wherein the anode comprises a conductive material selected from the group consisting of gold, carbon, platinum, ruthenium dioxide and palladium.

7. The electrochemical cell according to claim 6, wherein the anode comprises carbon or gold.

8. The electrochemical cell according to claim 1, wherein the substrate surface is roughened.

9. The electrochemical sensor according to claim 1, wherein the anode enzyme is a glucose-responsive enzyme.

10. The electrochemical cell according to claim 9, wherein the glucose-responsive enzyme is glucose oxidase or glucose dehydrogenase.

11. The electrochemical cell according to claim 9, wherein the glucose-responsive enzyme further comprises an enzyme cofactor.

12. The electrochemical cell according to claim 11, wherein the enzyme cofactor is pyrroloquinoline quinone (PQQ).

13. The electrochemical cell according to claim 1, wherein the cathode comprises platinum.

14. The electrochemical cell according to claim 1, wherein the cathode further comprises a cathode enzyme.

15. The electrochemical cell according to claim 14, wherein the cathode enzyme is an enzyme selected from the group consisting of tyrosinase, horseradish peroxidase, soybean peroxidase, laccase and cytochrome C peroxidase.

16. The electrochemical cell according to claim 15, wherein the cathode enzyme is laccase or cytochrome C peroxidase.

17. The electrochemical cell according to claim 1, wherein at least a portion of the electrochemical cell is configured to be subcutaneously positioned in a subject.

18. The electrochemical cell according to claim 1, wherein the electrochemical cell further comprises a mass transport limiting membrane disposed over the anode and cathode.

19. The electrochemical cell according to claim 18, wherein the mass transport limiting membrane is configured to limit contact of macromolecules of 5000 daltons or greater with the anode and cathode.

20. The electrochemical cell according to claim 18 wherein the mass transport limiting membrane is a hydrogel.

21. The electrochemical cell according to claim 20, wherein the hydrogel comprises at least 20 wt % fluid when in equilibrium with analyte-containing fluid.

* * * * *